United States Patent Office.

JOSEPH BOGAN AND JOHN B. McCRAY, OF CLARKSVILLE, OHIO.

Letters Patent No. 80,854, dated August 11, 1868.

IMPROVED OINTMENT.

*The Schedule referred to in these Letters Patent and making part of the same.*

TO ALL WHOM IT MAY CONCERN:

Be it known that we, JOSEPH BOGAN and JOHN B. McCRAY, of Clarksville, in the county of Clinton, and in the State of Ohio, have invented new and useful Improvements in Ointments; and we do hereby declare that the following is a full, clear, and exact description thereof.

Our invention consists in the use of the following-named ingredients: Sulphtic of iron, one ounce; yolk of egg, one; saltpetre, one grain; salt, three grains; lard, nine ounces; thoroughly mixed, and forming a homogeneous and consistent mass.

The above ingredients, when mixed, form a compound or produce an ointment for the cure of fistula, poll-evil, and nearly all chronic or inflammatory sores in horses or cattle, at all stages of the disease, and will not remove the hair where the same is applied; also for the cure of cancer, felons, boils, and catarrh, as well as many other affections of mankind.

We not wish to confine ourselves to any specific proportions of the parts or ingredients named.

Having thus fully described our invention, what we claim as new, and desire to secure by Letters Patent, is—

The within-described compound, when mixed and used substantially as and for the purpose specified.

In testimony that we claim the foregoing ointments, we have hereunto set our hands, this 29th day of January, 1868.

JOSEPH BOGAN,
JOHN B. McCRAY.

Witnesses:
JOSEPH HIGGINS,
ELI KIRK.